United States Patent
McNew et al.

(10) Patent No.: US 8,194,580 B2
(45) Date of Patent: Jun. 5, 2012

(54) SYSTEM AND METHOD FOR BROADCASTING APPLICATION-SPECIFIC INFORMATION IN WIRELESS LOCAL AREA NETWORKS

(75) Inventors: Justin Paul McNew, Santa Monica, CA (US); Johnny Yat Ming Chan, Arcadia, CA (US); Jun Liu, Sherman Oaks, CA (US)

(73) Assignee: Kapsch Trafficcom AG, Vienna (AT)

( * ) Notice: Subject to any disclaimer, the term of this patent is extended or adjusted under 35 U.S.C. 154(b) by 636 days.

(21) Appl. No.: 12/372,610

(22) Filed: Feb. 17, 2009

(65) Prior Publication Data

US 2009/0161595 A1 Jun. 25, 2009

Related U.S. Application Data

(63) Continuation of application No. 11/166,509, filed on Jun. 23, 2005, now Pat. No. 7,505,443.

(60) Provisional application No. 60/583,128, filed on Jun. 24, 2004.

(51) Int. Cl.
H04H 20/71 (2008.01)
(52) U.S. Cl. ....... 370/312; 370/328; 455/41.1; 455/41.2
(58) Field of Classification Search ............... 370/312, 370/328, 329, 338, 350, 470, 471, 473, 477; 455/403, 411, 414.1, 414.4, 432.2, 41.1–41.2, 455/466
See application file for complete search history.

(56) References Cited

U.S. PATENT DOCUMENTS

| | | | |
|---|---|---|---|
| 6,782,253 B1 * | 8/2004 | Shteyn et al. | 455/414.1 |
| 7,027,773 B1 | 4/2006 | McMillin | |
| 7,126,926 B1 * | 10/2006 | Bjorklund et al. | 370/328 |
| 7,151,764 B1 * | 12/2006 | Heinonen et al. | 370/338 |
| 7,191,247 B1 * | 3/2007 | Philyaw | 709/237 |
| 7,340,214 B1 * | 3/2008 | Hamberg | 455/41.2 |
| 7,505,590 B1 * | 3/2009 | Apostolopoulos | 380/210 |
| 7,903,620 B2 * | 3/2011 | Rudolf et al. | 370/338 |
| 2002/0087335 A1 * | 7/2002 | Meyers et al. | 705/1 |
| 2003/0171944 A1 * | 9/2003 | Fine et al. | 705/1 |
| 2003/0200455 A1 | 10/2003 | Wu | |
| 2004/0036611 A1 * | 2/2004 | Kidney et al. | 340/573.1 |
| 2004/0111526 A1 * | 6/2004 | Baldwin et al. | 709/231 |
| 2004/0160957 A1 * | 8/2004 | Coffman | 370/394 |
| 2004/0203616 A1 * | 10/2004 | Minear et al. | 455/412.1 |
| 2004/0223477 A1 * | 11/2004 | Iwasaki et al. | 370/338 |
| 2004/0249983 A1 * | 12/2004 | Bedner | 709/249 |
| 2004/0255008 A1 * | 12/2004 | Olsen et al. | 709/220 |
| 2005/0185626 A1 | 8/2005 | Meier et al. | |
| 2005/0232209 A1 | 10/2005 | Buckley et al. | |
| 2005/0286466 A1 | 12/2005 | Tagg et al. | |
| 2008/0013487 A1 | 1/2008 | Molteni et al. | |
| 2008/0046547 A1 | 2/2008 | Olsen et al. | |
| 2008/0046572 A1 | 2/2008 | Jagels | |
| 2008/0109679 A1 | 5/2008 | Wright et al. | |
| 2008/0119174 A1 * | 5/2008 | Farkas et al. | 455/414.1 |
| 2008/0201362 A1 | 8/2008 | Multer et al. | |

* cited by examiner

Primary Examiner — Cong Tran
(74) Attorney, Agent, or Firm — Christie, Parker & Hale, LLP

(57) ABSTRACT

A system and method for a novel broadcasting scheme (NBS) in a wireless local area network are described, which can operate with or without a network connection. The system permits transmission of application-specific data through a specific field in a beacon frame, the Service Set Identity (SSID). By implementing a NBS Processor in an AP and a NBS Parser in stations, the AP can broadcast application-specific data while the stations can automatically act upon the receipt of the broadcast.

22 Claims, 8 Drawing Sheets

| P | O | L | I | C | E | NULL | l | e | f | t | _ | t | w | o | _ | l | a | n | e | s | _ | c | l | o | s | e | d | NULL | NULL | NULL | NULL |

FIG. 11

| G | A | P | NULL | s | p | r | i | n | g | | s | a | l | e | | 4 | 0 | % | | o | f | f | NULL | NULL | NULL | NULL | NULL | NULL | NULL | NULL | NULL |

FIG. 12

SYSTEM AND METHOD FOR BROADCASTING APPLICATION-SPECIFIC INFORMATION IN WIRELESS LOCAL AREA NETWORKS

CROSS-REFERENCE TO RELATED APPLICATION(S)

This application is a continuation application of U.S. patent application Ser. No. 11/166,509, filed Jun. 23, 2005, now U.S. Pat. No. 7,505,443 which claims the benefit of U.S. Provisional Patent Application No. 60/583,128, filed Jun. 24, 2004, the disclosure of which is hereby incorporated by reference herein.

FIELD OF THE INVENTION

The present invention relates to a system and method for a broadcasting scheme in wireless local area networks.

BACKGROUND OF THE INVENTION

In an IEEE 802.11 wireless local area network (WLAN) standard, an access point (AP) controls network management of all stations. When a station moves in the coverage zone of an AP, it will first perform a number of network establishment procedures to join the network controlled by the AP. The network establishment procedures include scanning, synchronization, authentication and association. Then the communication or data transfer between the station and the network can start. In other words, for an AP to broadcast any application data to a station, the station needs to establish a network connection first. See, for example, ISO/IEC 8802-11 ANSI/IEEE Standard 802.11 Specification, 2003, the content of which is hereby expressly incorporated by reference herein.

Management frames are exchanged between an AP and a station for implementing network establishment procedures. One management frame type in the IEEE 802.11 standard (802.11) is the beacon frame that is transmitted periodically by an AP to allow stations to locate and identify an 802.11 WLAN. The beacon frame includes parameters that are related to the lower protocol layers (medium access control layer and physical layer). However, there is no defined field in the beacon frame for upper protocol layers to broadcast information or transmit application-specific data that trigger applications in stations.

SUMMARY OF THE INVENTION

In one embodiment, the invention is a method for transmitting application data in a wireless network. The method includes: placing the application data in a buffer; placing the application data from the buffer in a beacon frame of the wireless network data communication format; and broadcasting the beacon frame including the application data.

In one embodiment, the invention is a method for data communication in a wireless network. The method includes: placing an application data to be transmitted in a beacon frame of the wireless network data communication format; broadcasting the beacon frame including the application data through the wireless network; receiving the broadcast beacon frame; validating the frame as a beacon frame; and extracting the application data from the beacon frame.

In one embodiment, the invention is a system for data communication in a wireless network including: a processor for placing an application data to be transmitted in a beacon frame of the wireless network data communication format; a frame generator for assembling and broadcasting the beacon frame including the application data through the wireless network; a receiver for receiving the broadcast beacon frame; and a parser for extracting the application data from the beacon frame.

In one embodiment, the wireless network is an IEEE 802.11 wireless local area network and the application data is transmitted in a Service Set Identity (SSID) field of the beacon frame.

BRIEF DESCRIPTION OF THE FIGURES

FIG. 11 illustrates a first application example which does not require network connection; and FIG. 12 illustrates a second application example which does not require network connection.

DETAILED DESCRIPTION

In one embodiment the present invention is a system and method for a novel broadcasting scheme (NBS) in an IEEE 802.11 wireless local area network. The system permits transmission of application-specific data through a specific field in a beacon frame, the Service Set Identity (SSID). By implementing a NBS Processor in an AP and a NBS Parser in stations, the AP can broadcast application-specific data while the stations can automatically act upon the receipt of the broadcast.

Figure 1:
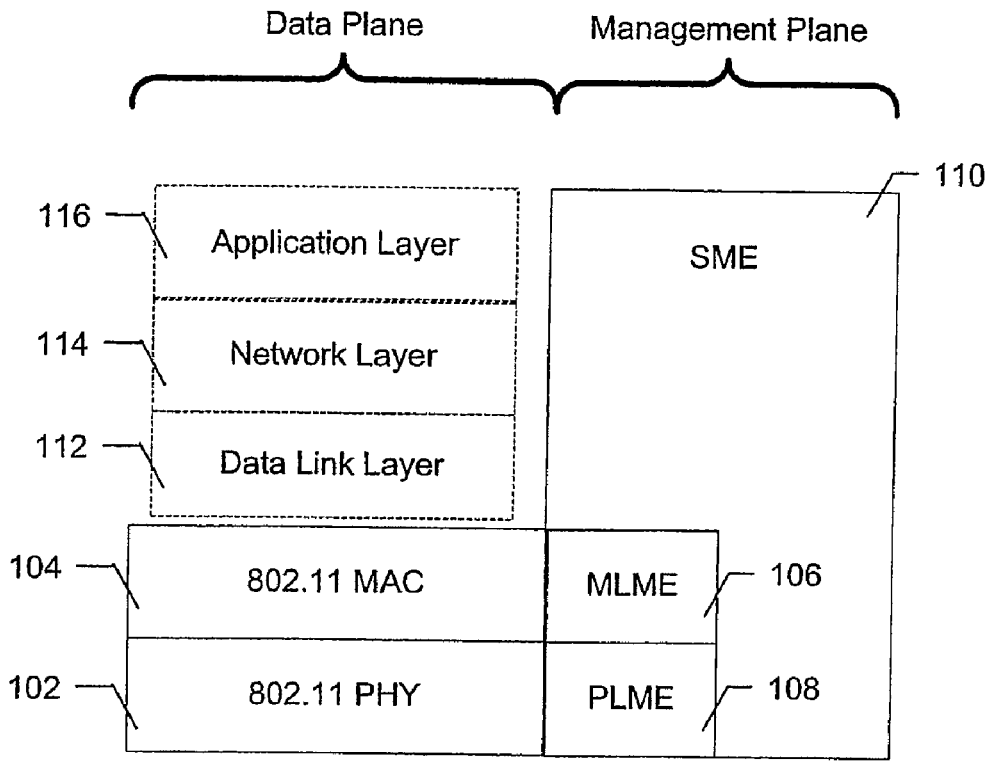
FIG. 1 is a protocol stack of 802.11 wireless local area networks.

A protocol stack of an IEEE 802.11 wireless local area network is shown in FIG. 1. The IEEE 802.11 standard covers the lower layers: medium access (MAC) layer 104 and physical (PHY) layer 102. The corresponding management entities are MAC layer management entity (MLME) 106 and PHY layer management entity (PLME) 108. The system management entity (SME) 110 is the interface to management functions outside IEEE 802.11. The exemplary upper layers are shown in the dashed boxes, which contains data link layer 112, network layer 114 and application layer 116. As also shown in FIG. 1, the protocol stack includes two vertical planes. A data plane handles user data transfer while a management plane handles network management functions. Network access management has to be completed before any user data transfer through the data plane.

Figure 2:
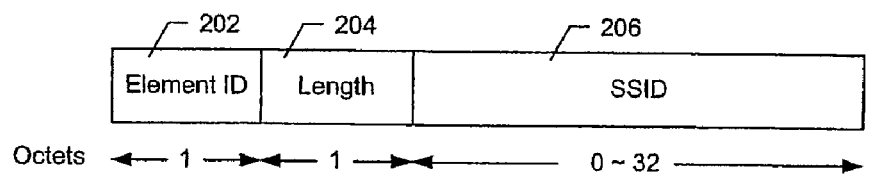
FIG. 2 is a SSID element format in IEEE 802.11.

The IEEE 802.11 standard includes management capabilities in its MAC layer. One management frame type defined in the standard is the beacon frame. The beacon frame is transmitted periodically by an AP to allow client stations to locate and identify an 802.11 WLAN. It includes several mandatory fields, one of which is the Service Set Identity (SSID) field, which is used to identify a specific wireless LAN. The format of the SSID element is shown in FIG. 2. The Element ID field 202 identifies the element as the SSID, and the Length field 204 indicates the length of the SSID data. As indicated in FIG. 2, the SSID field 206 may be up to 32 octets (256 bits). There is no restriction on the format of the content of the SSID field. It may be a null-terminated string of ASCII characters or a multi-byte binary string.

Figure 3:
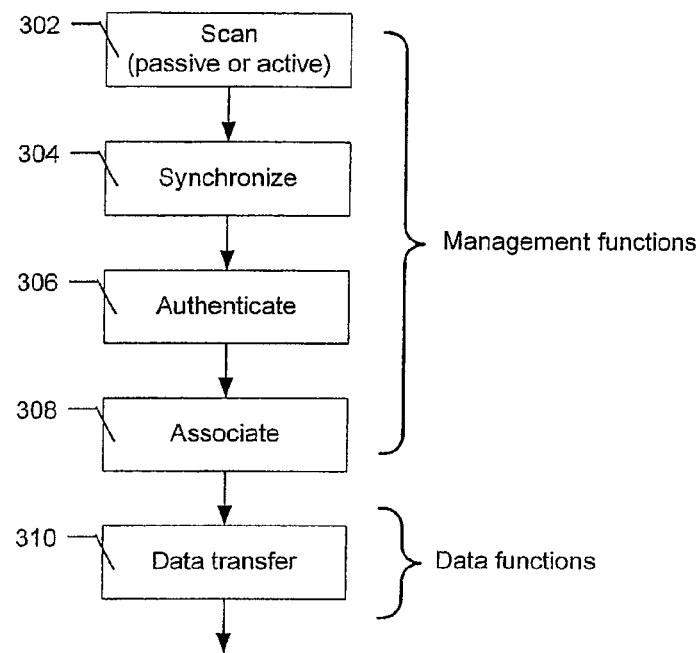
FIG. 3 is a process flow of network access and data transfer in IEEE 802.11.

FIG. 3 is a process flow of network access and data transfer in IEEE 802.11. As shown in block 302, upon power up or moving into a coverage zone of an 802.11 WLAN, the first task of a station is to perform scanning to determine whether an acceptable WLAN is available. Two options are possible: passive and active. In a passive scanning, the station tunes to a channel and listens for beacon transmission. In an active scanning, the station tunes to a channel and transmits a probe request frame, which should trigger a response if a WLAN is present. In either case, the station may check multiple channels, with positive or negative results experienced before moving to the next step.

If the station has no success in locating a WLAN, it continues to scan. Upon the receipt of the message from the network (beacon frame or probe response frame), the station has sufficient information such as SSID and timing to synchronize (block 304) to the network. To join the network, the next two steps are authentication 306 and association 308, each involved with a few management frame exchanges. After associating with the network, the station may send or receive data frames as shown in block 310. In various scenarios, it is desirable to automatically launch or execute an application, either with or without a network connection. As one example, an AP requires a station to automatically run a specific web page after network connection establishment. As another example, an AP installed in a particular shop broadcasts its commercial message; any pass-by station can receive it without establishing a network connection.

The beacon in an 802.11 WLAN plays an important role in network management. An AP periodically broadcasts the beacon to announce its presence. A beacon is typically the first message received by a station from an 802.11 WLAN. The SSID element of a beacon is used to indicate the identity of a WLAN. A SSID string is typically short, though the SSID field may be up to 32 octets as shown in FIG. 2. In one embodiment, the invention utilizes the unused space in the SSID field to store application-specific data while the normal operations of any existing 802.11 WLAN are maintained uninterruptedly.

Figure 4:
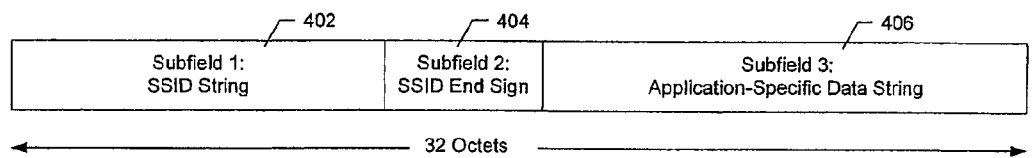
FIG. 4 is a format of the SSID field, according to one embodiment of the present invention.

An exemplary new format of the SSID field is shown in FIG. 4. The first subfield 402 is the SSID string, the second subfield 404 indicates the end of the SSID string, and the third subfield 406 is the application-specific data string. All three subfields can be in the form of either character or binary. For example, the SSID string is an ASCII character string, the SSID End sign is the NULL character and the application-specific data string is an encrypted character string. The manner in which an application utilizes the extra data in the third subfield 406 is independent of the system described herein.

Figure 5:
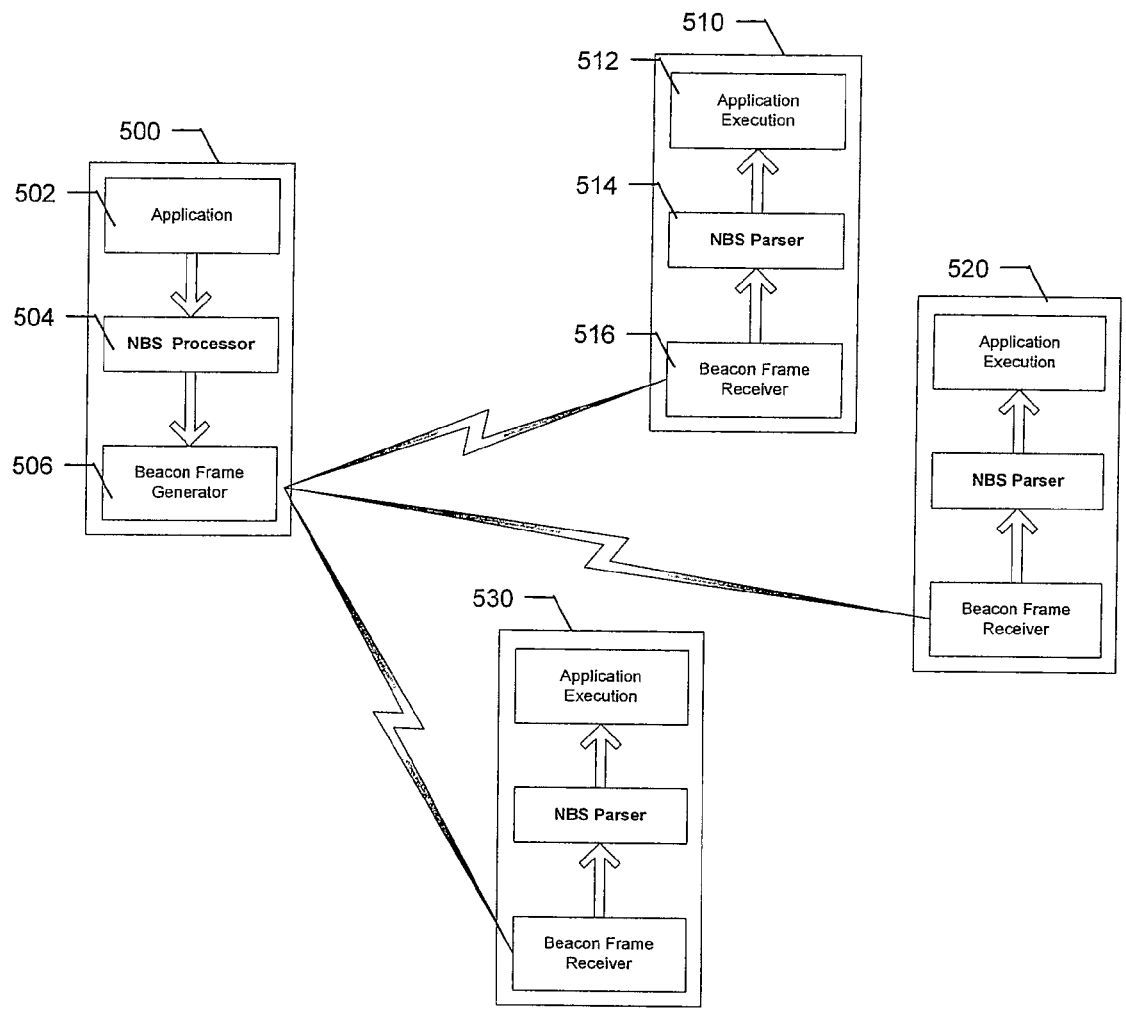
FIG. 5 is an exemplary illustration of a novel broadcasting system (NBS) in an IEEE 802.11 wireless local area network, according to one embodiment of the present invention.

To enable the novel broadcasting scheme (NBS) in an 802.11 WLAN, a NBS Processor is added to the AP or the transmission station; and a NBS Parser is added to the client station or the reception station. A NBS system in an 802.11 WLAN is shown in FIG. 5. As shown, there are one transmission station 500 and multiple reception stations 510, 520 and 530.

The transmission station 500 includes three main components: an application (module) 502, a NBS processor 504 and a beacon frame generator 506. The application module 502 is responsible for interfacing with end users and transfers user data to the NBS processor. The NBS processor 504 takes the data, prepares it accordingly as the application-specific data string in the SSID field. The SSID is then transferred to the beacon frame generator. The beacon frame generator 506 assembles the beacon frame and broadcasts it periodically.

Each reception station also includes three main components: an application execution (module) 512, a NBS parser 514 and a beacon frame receiver 516. Once the beacon frame receiver 516 receives a frame, it first validates the frame. If the frame is validated as a beacon frame, the beacon frame receiver passes the content of SSID field to the NBS parser 514. The NBS parser then interprets (extracts) the application-specific data string in the SSID field accordingly. The interpreted data is transferred to the application execution module 512. The application execution module may be displaying the data string, or automatically launching a specific application based on the data string.

Figure 6:
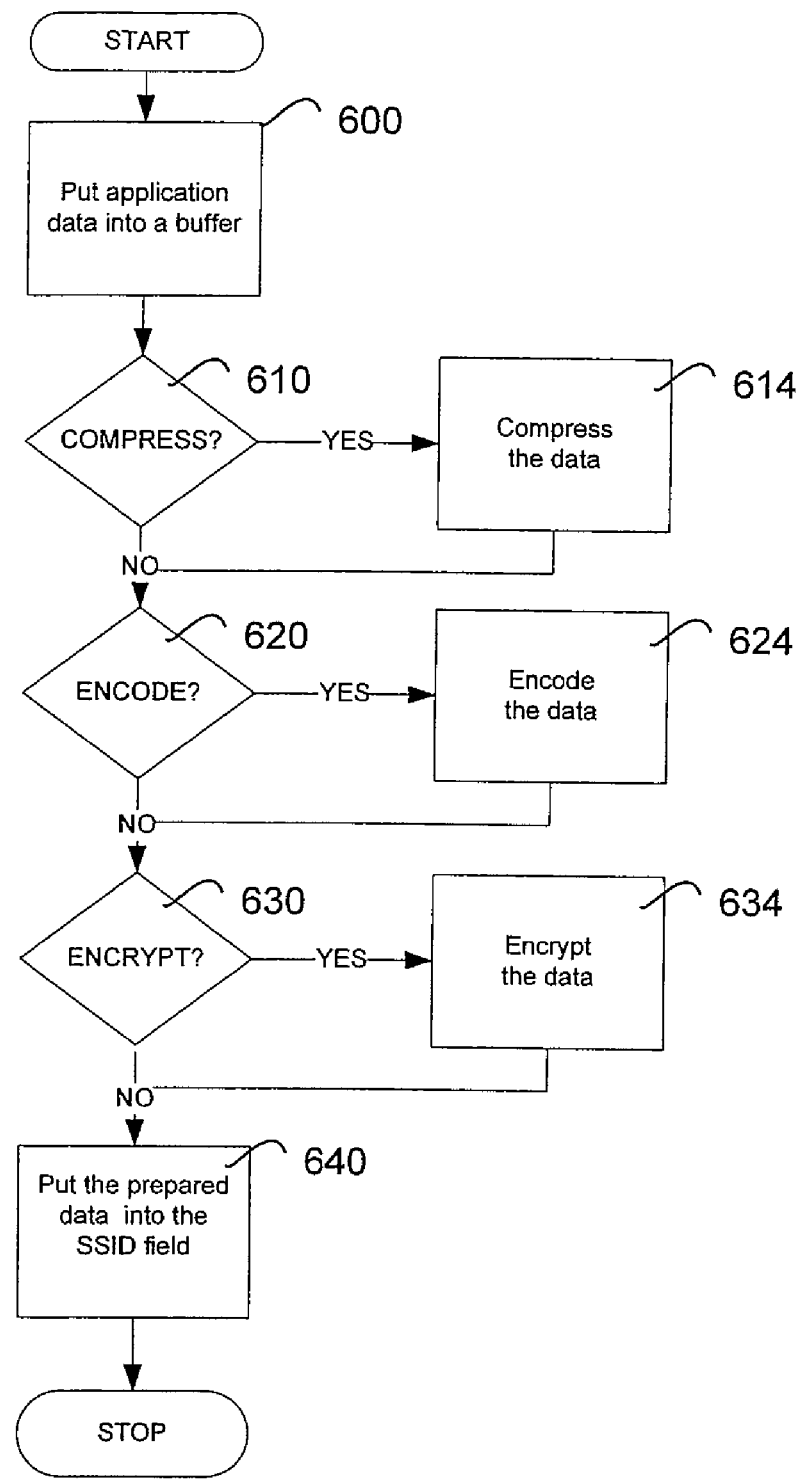
FIG. 6 is an exemplary process flow for a NBS processor in a transmission station, according to one embodiment of the present invention.

FIG. 6 is an exemplary process flow for a NBS processor in a transmission station, according to one embodiment of the present invention. The NBS processing begins in block 600 where the NBS Processor (504 in FIG. 5) inputs the application data to a data buffer. In block 610, the NBS processor determines whether a data compression algorithm is needed to be applied to the data. If no data compression is needed, the process goes to block 620. If data compression is needed, the process goes to block 614 and the data is compressed accordingly. In block 620, the NBS processor determines whether an encoding algorithm is needed to be applied to the data. If not, the process moves to block 630. If encoding is needed, the process goes to block 624 and the data is encoded accordingly. In block 630, the NBS processor determines whether an encryption algorithm is needed to be applied to the data. If not, the process moves to block 640. If encryption is needed, the process goes to block 634 and the data is encrypted accordingly. Finally, the NBS processor places the prepared data as the application-specific data string in the SSID field of the beacon frame to be broadcast, in block 640.

Figure 7:
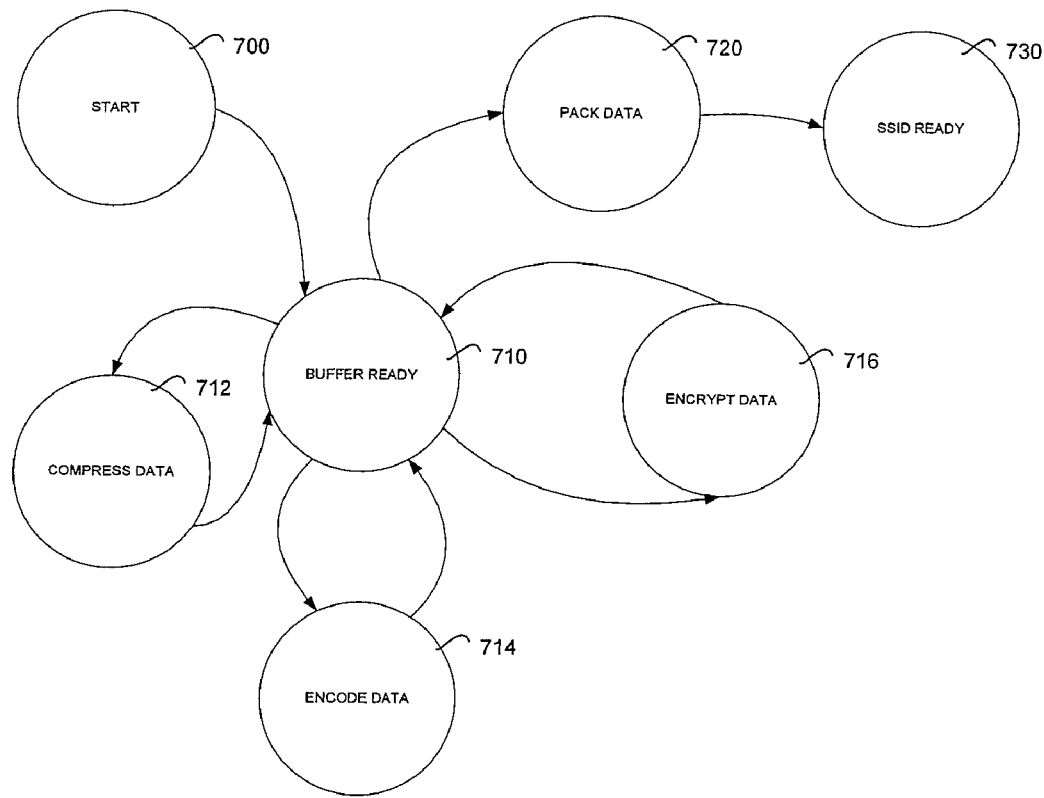
FIG. 7 is an exemplary state machine for a NBS processor in a transmission station, according to one embodiment of the present invention.

FIG. 7 is an exemplary state machine for a NBS processor in a transmission station, according to one embodiment of the present invention. As shown, the START state 700 is for waiting for application data to be ready. If the data is ready, the state machine changes state to state 710. At state 710, the application data is placed in a data buffer. The next COMPRESS DATA state 712 is an optional state. In this state, the data is compressed and the output is stored back to the data buffer. The state machine returns to state 710 after data compression.

The ENCODE DATA state 714 is also optional. In this state 714, the data is encoded and the output is stored back to the data buffer. The state machine returns to state 710 after data encoding. The ENCRYPT DATA state 716 is optional as well. In state 716, the data is encrypted and the output is stored back to the data buffer. The state machine returns to state 710 after data encryption.

The next state is PACK DATA state 720. In this state, the prepared data in the data buffer is placed as the application-specific data string in the SSID field. The next state, SSID READY state 730 indicates that the SSID is ready to be sent to the beacon frame generator 506 to be broadcast.

Figure 8:
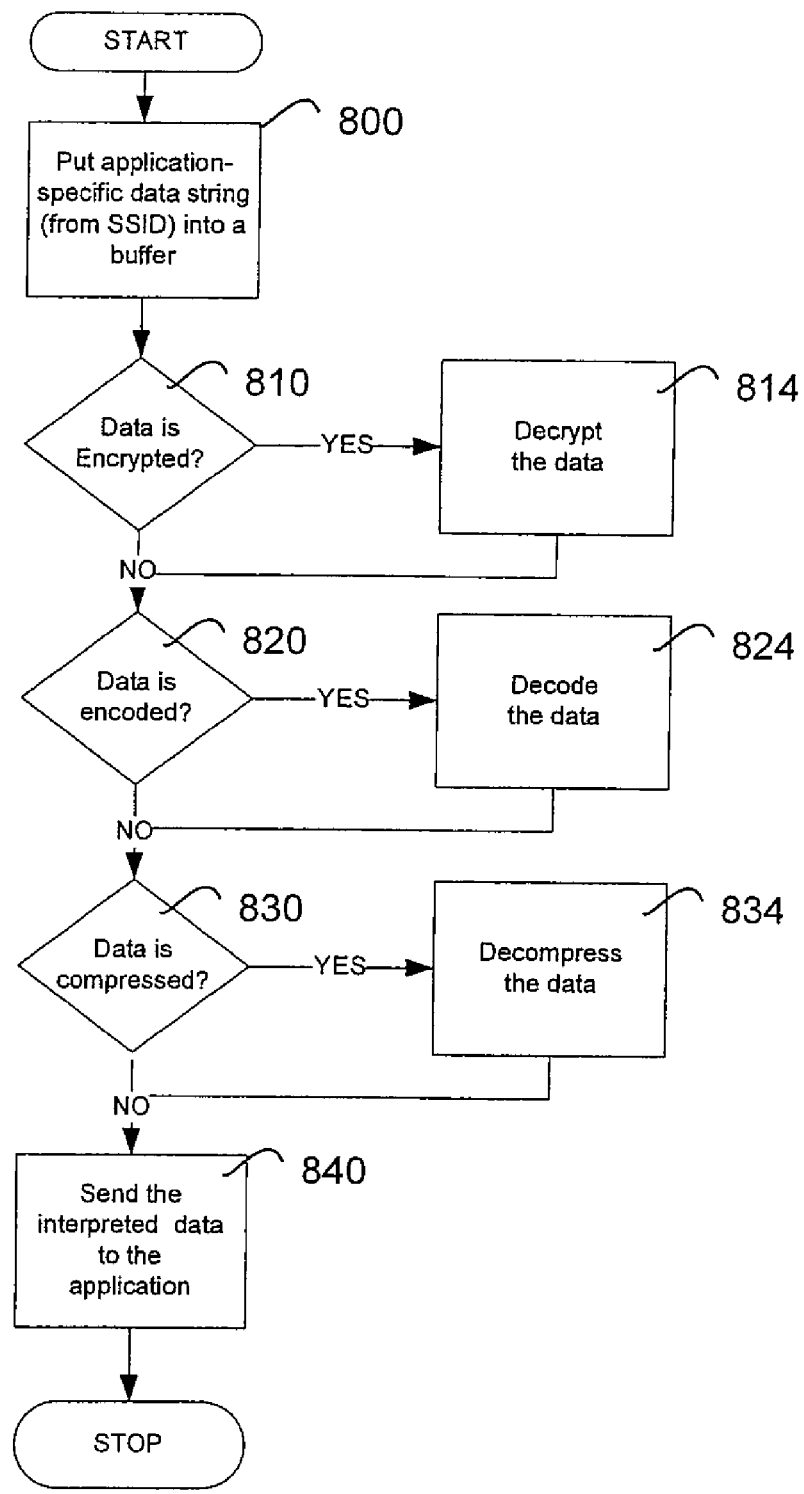
FIG. 8 is an exemplary process flow for a NBS processor in a reception station, according to one embodiment of the present invention.

FIG. 8 is an exemplary process flow for a NBS processor in a reception station, according to one embodiment of the present invention. The beacon frame receiver (516 in FIG. 5) sends the application-specific data string in the SSID field to the NBS parser (514 in FIG. 5). The NBS parsing begins in block 800 where the NBS Parser places the application-specific data string in a data buffer. In block 810, the NBS parser determines whether the data is encrypted. If not, the process goes to block 820; if yes, the process goes to block 814 and the data is decrypted accordingly. In block 820, the NBS parser determines whether the data is encoded. If not, the process moves to block 830; if yes, the process goes to block 824 and the data is decoded accordingly. In block 830, the NBS parser determines whether the data is compressed. If not, the process will move to block 840; if yes, the process goes to block 834 and the data is decompressed accordingly. Finally, the NBS Parser sends the interpreted data to the application in block 840.

Figure 9:
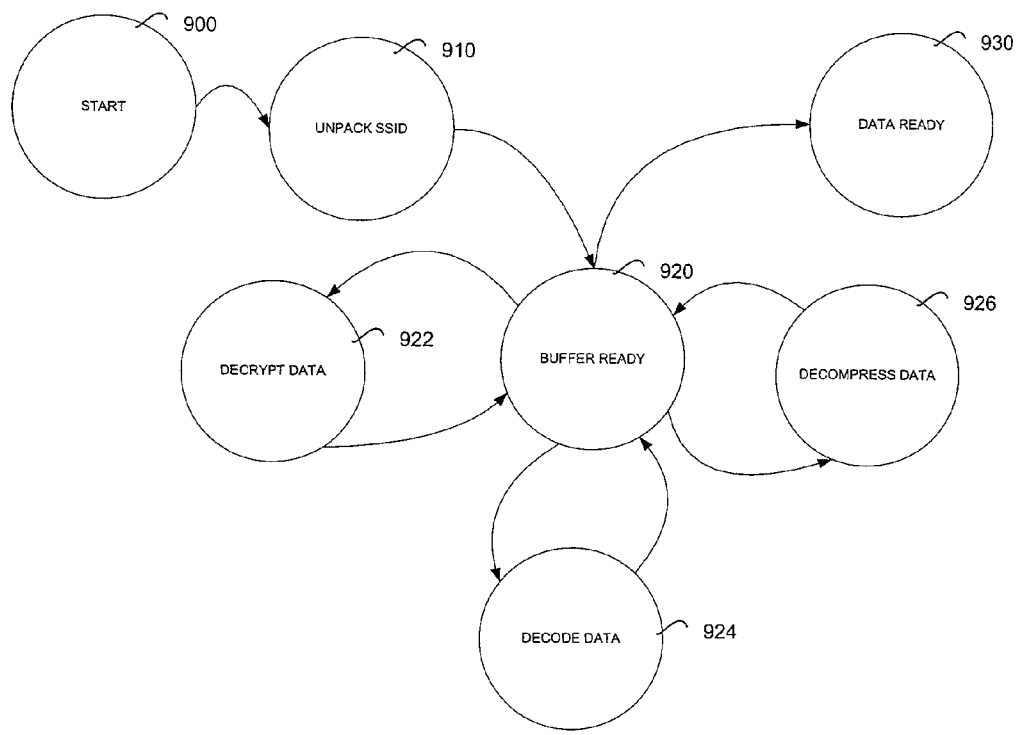
FIG. 9 is an exemplary state machine for a NBS processor in a reception station, according to one embodiment of the present invention.

FIG. 9 is an exemplary state machine for a NBS processor in a reception station, according to one embodiment of the present invention. As depicted, a START state 900 is for waiting for the received SSID to be ready. If the SSID is ready, the state machine goes to state 910. In state 910, the application-specific data string is separated from the SSID field and the state machine goes to state 920. In state 920, the application-specific data string is placed in a data buffer. The next state DECRYPT DATA state 922 is optional. In this state, the data is decrypted and the output is stored back to the data buffer. The state machine then returns to state 920 after data decryption.

A DECODE DATA state 924 is also optional. In state 924, the data is decoded and the output is stored back to the data buffer. The state machine then returns to state 920 after data decoding. The DECOMPRESS DATA state 926 is optional as well. In this state, the data is decompressed and the output is stored back to the data buffer. The state machine returns to state 920 after data decompression. The next state, DATA READY state 930 indicates that the data is ready to be sent to the application execution (512 in FIG. 5) for execution.

Two categories of applications could apply this method. The first category requires establishing network connection. The second category requires no network connection.

Figure 10:
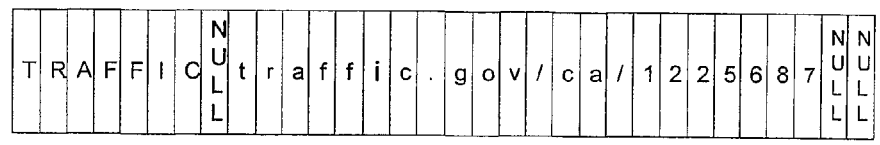
FIG. 10 illustrates an application example which requires network connection.

An example of the first category is shown in FIG. 10. An exemplary SSID string is "TRAFFIC", which use a total of eight octets representing this null-terminated string. The specified URL string is "traffic.gov/ca/1225687". Both strings are packed in the SSID field. An AP connected to the traffic light #1225687 in California broadcasts this message through the SSID element of beacons. Any station in the coverage zone of this AP is able to establish the network connection with the WLAN "TRAFFIC" when receiving the corresponding beacon frame. After the network connection is established, the NBS parser of the station launches the web browser, utilizes the established network connection and loads the real-time traffic signal from URL "traffic.gov/ca/1225687".

An example of the second category is shown in FIG. 11. An exemplary SSID string is "POLICE", which uses a total of seven octets representing this null-terminated string. The application data string is "left two lanes closed". Both strings are packed in the SSID field. An AP with the NBS processor, installed where left two lanes are closed, broadcasts the message through the SSID element of beacons. Any vehicle with a station including a NBS parser is notified right after receiving one single beacon from the AP, without network connection with the AP.

In the above two examples, the AP broadcasts location based information. In the first example, a pass-by station retrieves the status of the traffic signal co-located with the AP. In the second example, a pass-by station receives the road condition near the location of the AP.

A non-location based exemplary application is shown in FIG. 12. An exemplary SSID string is "GAP™", which uses a total of four octets representing this null-terminated string. The application data string is "spring sale 40% off". Both strings are packed in the SSID field. All Access Points from the commercial operator (e.g. a retail store chain) equipped with NBS Processor broadcast the message through the SSID element of the beacons. When a person with a cell phone equipped with a NBS parser walks into the coverage of this AP, the cell phone picks up the beacon frame, the NBS parser unpacks the "male pique polo sale $12.99" message and displays it on the screen of the cell phone as a real-time advertisement. No network connection establishment is required in this example.

What is claimed is:

1. A method for transmitting a commercial message in a wireless network, the method comprising:
    placing the commercial message in a management frame of the wireless network data communication format, wherein the commercial message includes data unrelated to the wireless network;
    broadcasting the management frame including the commercial message;
    receiving the management frame including the commercial message unrelated to the wireless network; and
    directly displaying the received commercial message unrelated to the wireless network responsive to the received management frame.

2. The method of claim 1, further comprising compressing and encoding the commercial message before placing it in the management frame.

3. The method of claim 1, wherein the management frame is a beacon frame.

4. The method of claim 1, wherein the management frame is a probe response frame.

5. The method of claim 1, wherein the wireless network is an IEEE 802.11 wireless local area network and the application data is transmitted in any management frame.

6. The method of claim 1, wherein the receiving, and directly displaying are performed before a network connection is established.

7. The method of claim 1, wherein the receiving, and directly displaying are performed after a network connection is established.

8. The method of claim 1, wherein the commercial message includes location based information displayed for a user.

9. A system for transmitting a commercial message in a wireless network comprising:
    an application module for receiving the commercial message, wherein the commercial message includes data unrelated to the wireless network;
    a processor for preparing the received commercial message and placing the received commercial message in a management frame;
    a transmitter for assembling and broadcasting the management frame; and
    a receiver for receiving the management frame including the commercial message unrelated to the wireless network and directly displaying the received commercial message unrelated to the wireless network responsive to the received data in the management frame, on a display screen.

10. The system of claim 9, wherein there is no wireless network connection established between the transmitter broadcasting the beacon frame and the receiver.

11. The system of claim 9, wherein the management frame is a beacon frame.

12. The system of claim 9, wherein the management frame is a probe response frame.

13. The system of claim 9, wherein the wireless network is an IEEE 802.11 wireless local area network and the commercial message is transmitted in a Service Set Identity (SSID) field of a beacon frame.

14. The system of claim 9, wherein the wireless network is an IEEE 802.11 wireless local area network and the commercial message is transmitted in any management frame.

15. A method for data communication in a wireless network, the method comprising:
   placing an application data to be transmitted in a management frame of the wireless network data communication format, wherein the application data includes data to execute a program unrelated to the internet or a web browser, and the wireless network;
   broadcasting the management frame including the application data through the wireless network by a transmitter;
   receiving the broadcast management frame by a receiver;
   extracting the application data from the management frame; and
   executing the program unrelated to the wireless network responsive to the received data in the management frame.

16. The method of claim 15, wherein the wireless network is an IEEE 802.11 wireless local area network and the application data is broadcast in a Service Set Identity (SSID) field of a beacon frame.

17. The method of claim 15, wherein the receiving, extracting, and executing are performed before a network connection is established between the receiver and the transmitter.

18. The method of claim 15, wherein the application data is location based information displayed for a user.

19. The method of claim 15, wherein the application data is advertisement displayed for a user.

20. The method of claim 15, wherein the management frame is a beacon frame.

21. The method of claim 15, wherein the management frame is a probe response frame.

22. The system of claim 15, wherein the wireless network is an IEEE 802.11 wireless local area network and the application data is transmitted in any management frame.

* * * * *